United States Patent
Jeon et al.

(10) Patent No.: US 6,833,212 B2
(45) Date of Patent: Dec. 21, 2004

(54) ELECTROLYTE FOR A FUEL CELL

(75) Inventors: Yoocharn Jeon, Palo Alto, CA (US); Alfred I-Tsung Pan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 300 days.

(21) Appl. No.: 10/112,255

(22) Filed: Mar. 29, 2002

(65) Prior Publication Data

US 2003/0186108 A1 Oct. 2, 2003

(51) Int. Cl.[7] ............................. H01M 8/10; H01M 4/90
(52) U.S. Cl. ........................... 429/30; 429/40; 429/41
(58) Field of Search ..................... 429/30, 40, 41, 429/44; 29/623.1

(56) References Cited

U.S. PATENT DOCUMENTS

| | | | |
|---|---|---|---|
| 5,234,722 A | 8/1993 | Ito et al. | 427/453 |
| 5,234,777 A | 8/1993 | Wilson | 429/33 |
| 5,395,704 A | 3/1995 | Barnett et al. | 429/30 |
| 5,527,633 A | 6/1996 | Kawasaki et al. | 429/30 |
| 5,631,099 A | 5/1997 | Hockaday | 429/30 |
| 5,716,422 A | 2/1998 | Muffoletto et al. | 29/623.5 |
| 5,759,712 A | 6/1998 | Hockaday | 429/30 |
| 6,224,993 B1 * | 5/2001 | Hartvigsen et al. | 429/30 |
| 6,248,468 B1 | 6/2001 | Ruka et al. | 429/40 |
| 6,309,772 B1 | 10/2001 | Zuber et al. | 429/33 |
| 6,582,845 B2 * | 6/2003 | Helfinstine et al. | 429/33 |
| 6,673,130 B2 * | 1/2004 | Jankowski et al. | 29/623.5 |
| 6,706,435 B1 * | 3/2004 | Biegert et al. | 429/33 |

FOREIGN PATENT DOCUMENTS

| | | | | |
|---|---|---|---|---|
| WO | WO 00/69007 | | 11/2000 | H01M/4/86 |
| WO | WO 00/72391 | | 11/2000 | H01M/4/00 |
| WO | WO 00/77873 A1 * | | 12/2000 | H01M/8/10 |

* cited by examiner

*Primary Examiner*—Tracy Mae Dove

(57) ABSTRACT

An electrolyte for a fuel cell includes an electrolyte body, a plurality of microstructures formed into or extending out of the electrolyte body, and thin film layers formed on the electrolyte body. A microstructure possesses a depth or a height and includes one or more sidewalls and a bottom surface. A sidewall of the microstructure advantageously creates a significant unobstructed diffusion area, wherein protons may travel laterally into or out of the electrolyte body. Therefore, when a proton is generated by the interaction of the fuel with a thin film catalyst layer, the proton may travel laterally only a short distance in order to enter or exit the electrolyte body, thereby improving the performance of the fuel cell.

39 Claims, 7 Drawing Sheets

(SECTION BB)

(SECTION BB)

ELECTROLYTE FOR A FUEL CELL

FIELD OF THE INVENTION

The present invention relates generally to fuel cells, and more particularly to a fuel cell electrolyte and catalyst.

BACKGROUND OF THE INVENTION

Fuel cells are devices that rely on electrochemical reactions to generate electrical current. Fuel cells operate upon oxidation of fuel. The fuel may be hydrogen or hydrogen-based compounds, such as methanol, alcohol, etc. A fuel cell includes an anode and a cathode, with an electrolyte in between the two electrodes.

One type of fuel cell is the proton-exchange membrane (PEM) fuel cell. In a PEM fuel cell, a catalyst in the anode splits the hydrogen into protons and electrons and the membrane further is capable of allowing just the protons to pass through to the cathode. Electrons must travel around the membrane and thus create an electrical current. The PEM fuel cell is simple, highly efficient, tolerant of impurities in the fuel, and can at least partially internally reform hydrocarbon fuels.

FIG. 1 shows a typical PEM fuel cell 100. Fuel such as $H_2$ passes through the anode 103 and is split into protons (H+) and electrons (e−) by the catalyst layer 104. The protons pass through the electrolyte layer 107 to the cathode 112, while the electrons travel through an external load circuit 115 and may perform electrical work. When the protons meet oxygen at the cathode 112, they combine to produce $H_2O$. The output of the fuel cell 100 therefore is water and electrical current.

FIG. 2 shows a prior art catalyst layer 104 and electrolyte 107. The catalyst layer 104 is formed on the electrolyte 107, and typically comprises carbon particles that may be applied in a paste form. In the paste, the carbon particles are mixed with a binder dissolved in a solvent, wherein the binder hardens to form a relatively solid but porous structure of particles. Alternatively, in some prior art fuel cells, particles are sintered (heated) until they bond, forming a porous structure. As a result, the porosity of the prior art catalyst layer 104 is somewhat random and the porosity gives a large amount of surface area over which the $H_2$ can react.

However, the prior art has several drawbacks. Platinum is a typical element used for the catalyst layer 104, and platinum is very expensive. The prior art approach to forming the catalyst layer 104 results in a relatively thick layer and is therefore wasteful and costly. In addition, the thickness of the prior art catalyst layer 104 results in a large distance for protons to traverse, which decreases the efficiency of the prior art fuel cell.

Therefore, there remains a need in the art for improvements in fuel cells.

SUMMARY OF THE INVENTION

An electrolyte for a fuel cell comprises an electrolyte body, a plurality of microstructures formed into or extending out of the electrolyte body, and thin film layers formed on the electrolyte body. A microstructure possesses a depth or a height and includes one or more sidewalls and a bottom surface. A sidewall of the microstructure advantageously creates a significant unobstructed diffusion area, wherein protons may travel laterally into or out of the electrolyte body. Therefore, when a proton is generated by the interaction of the fuel with a thin film layer, the proton may travel laterally only a short distance in order to enter or exit the electrolyte body, thereby improving the performance of the fuel cell.

DETAILED DESCRIPTION

Figure 1:
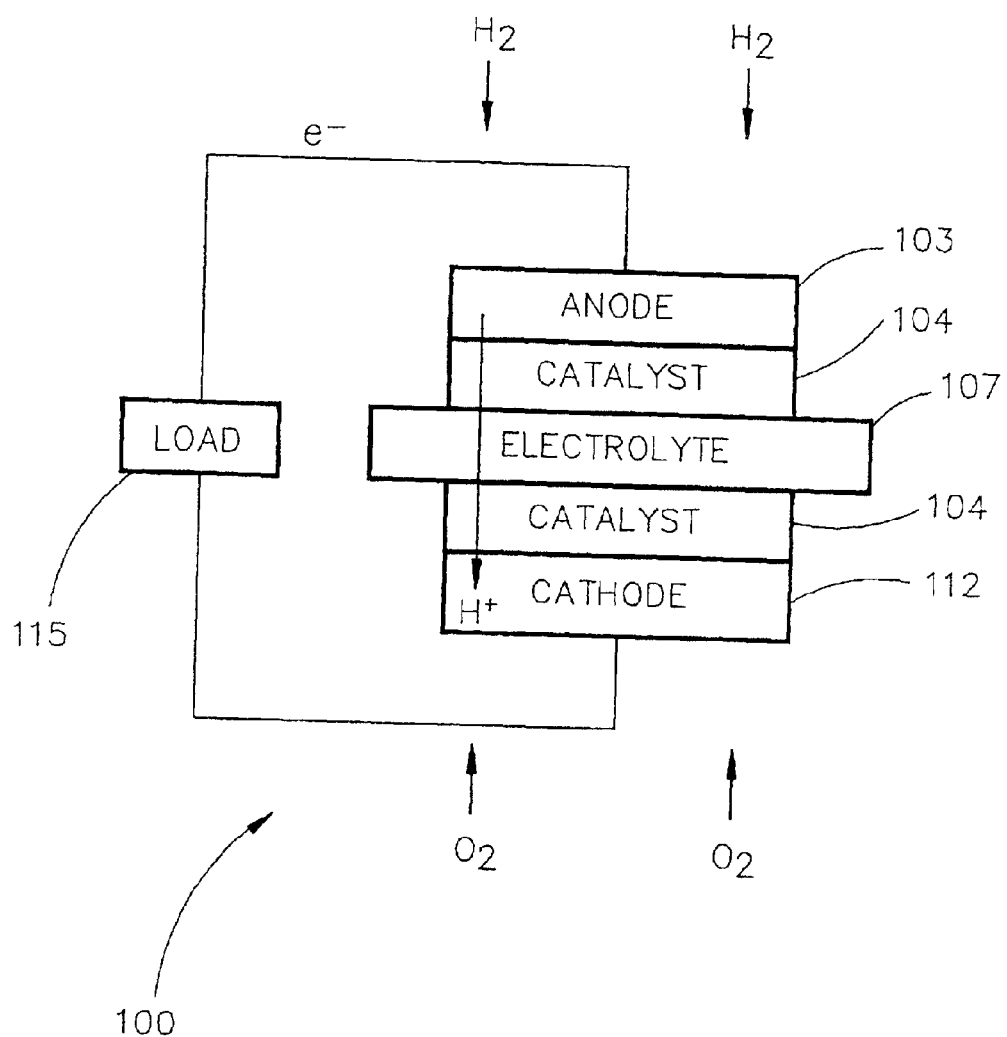
FIG. 1 shows a typical proton-exchange membrane (PEM) fuel cell.
Figure 2:
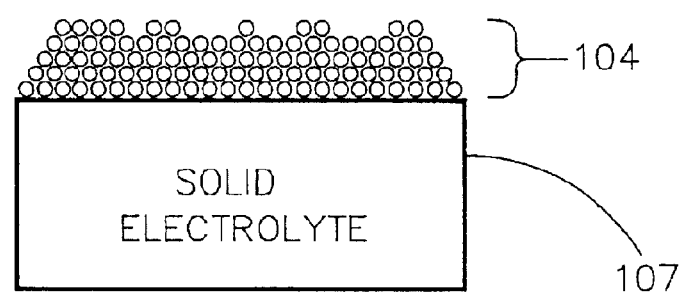
FIG. 2 shows a prior art catalyst layer and electrolyte.
Figure 3:
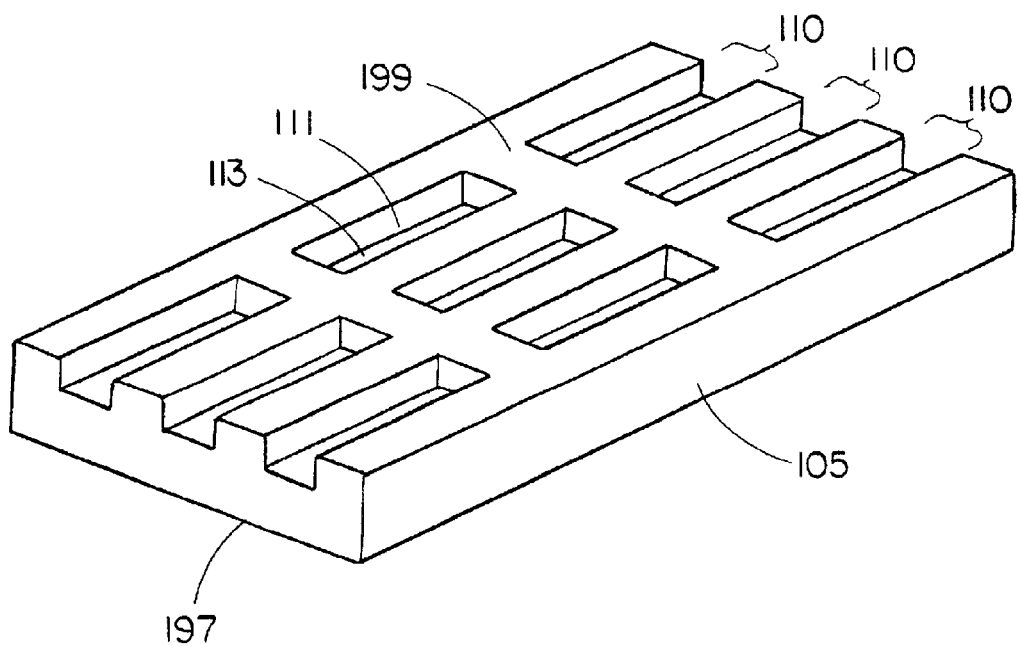
FIG. 3 shows a portion of an electrolyte body according to one embodiment of the invention.

FIG. 3 shows a portion of an electrolyte body 105 according to one embodiment of the invention. The electrolyte body 105 includes an anode surface 199 and a cathode surface 197 (may be opposing to the anode surface 199 but is not limited to that configuration). The solid electrolyte 105 further includes a plurality of microstructures 110 formed in the electrolyte body 105 and into the anode surface 199, into the cathode surface 197, or into both surfaces. The microstructures 110 are shown only in the anode surface 199 for purposes of clarity. In should be understood that if microstructures 110 are formed into both surfaces, the microstructures on the two surfaces may be aligned, alternating, offset, etc.

Figure 5:
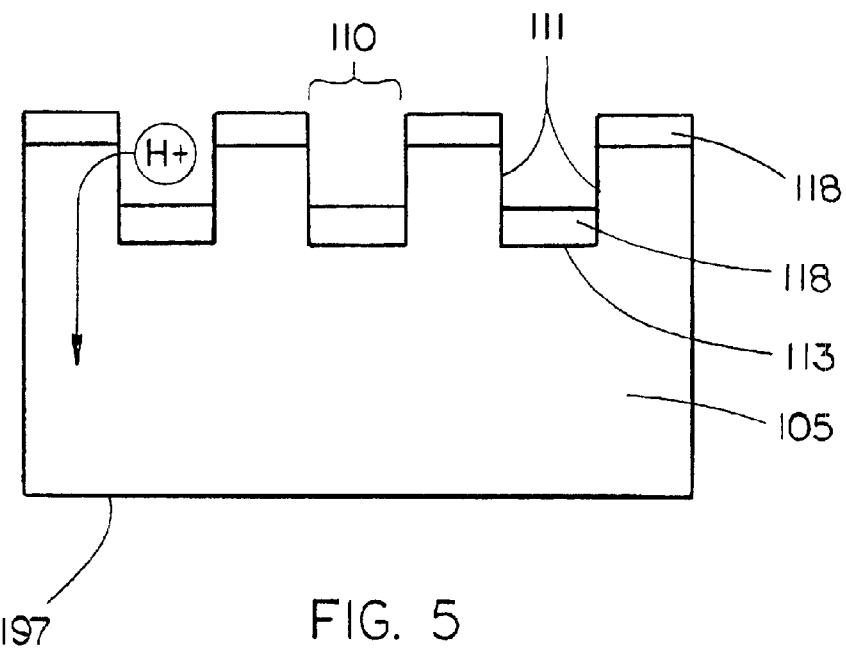
FIG. 5 is an end view of an electrolyte body including a thin film layer.
Figure 6:
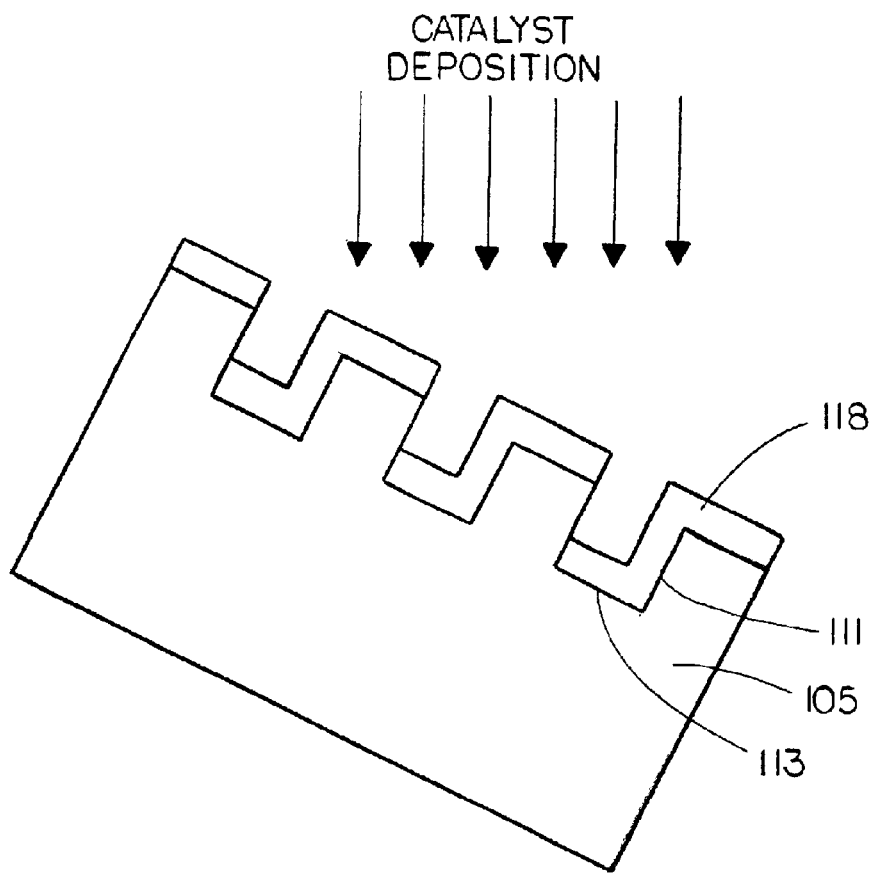
FIG. 6 is an end view of the electrolyte body according to another embodiment of the invention.

A thin film layer 118, such as a thin film catalyst or barrier layer, for example, may be formed on both sides of the electrolyte body 105 and may be formed in conjunction with microstructures 110 (see FIGS. 5 and 6). In addition, an anode layer may be formed on the thin film layer 118, with a portion of the thin film and anode material therefore being laterally located from sidewalls of the electrolyte body 105. It should be noted that the drawing is not to scale and is provided only to illustrate the inclusion of a plurality of microstructures 110 in the electrolyte body 105.

A microstructure 110 includes at least one sidewall 111 and may be formed in any shape. For example, a microstructure 110 may be rectangular, including two sidewalls and two end walls, as shown in the figure. Alternatively, a microstructure 110 may include beveled or angled sidewalls, may be hexagonal, may be any manner of parallelogram, or may have an ovoid or circular shape, including only one sidewall. It should be understood that other shapes may be used.

The sidewalls may be substantially vertical and the bottom surface 113 of the microstructure 110 may be substantially co-planar with the anode surface 199. It should be understood that a microstructure 110 of any shape may be fabricated if it can provide sidewall area.

A sidewall 111 of the microstructure 110 advantageously creates a significant unobstructed diffusion area, wherein hydrogen ions/protons may travel laterally into (and out of) the electrolyte body 105. Smaller and denser microstructures 110 fabricated into the electrolyte body 105 provide more surface area for proton diffusion into the electrolyte body 105 from the anode side and out of the electrolyte body 105 on the cathode side. This is accomplished without a reduction of area for proton production on the thin film layer 118. A proton therefore may laterally enter or exit the electrolyte body 105.

A microstructure 110 may be formed of any size. Therefore, through microfabrication techniques, a microstructure 110 may be very small. A microstructure 110 may be formed to be any depth. Preferably, a microstructure 110 is relatively long and narrow, as a narrow microstructure 110 provides a shorter travel distance into the electrolyte body 105 for the free protons.

The length of a microstructure 110 may be related to the width. For example, in one embodiment a microstructure 110 is formed with a 10:1:1 length to width to depth ratio. If the length is too short, the total sidewall area will be small. However, if the length of the sidewall is too large, the electrical resistance of narrow catalyst lines on the bottom surfaces 113 will be high.

Figure 4:
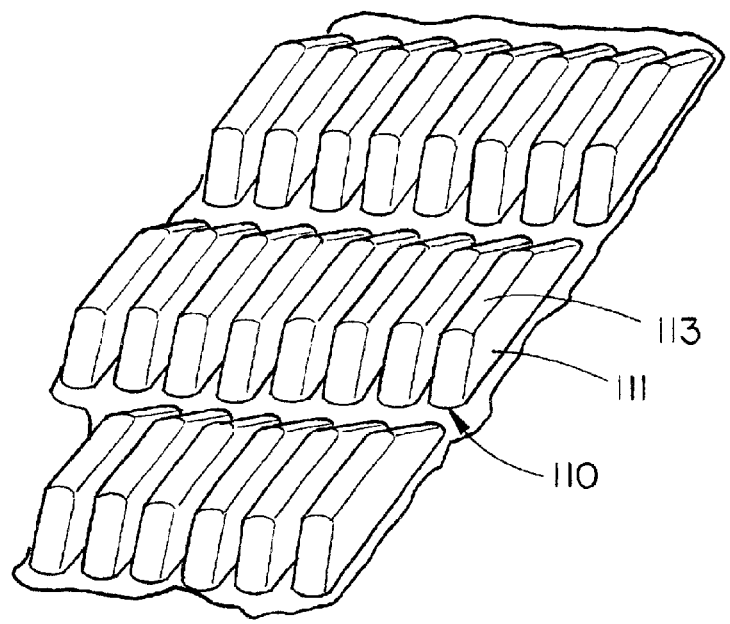
FIG. 4 shows a portion of the electrolyte body 105 according to another embodiment of the invention.

FIG. 4 shows a portion of the electrolyte body 105 according to another embodiment of the invention. The microstructures 110 in this embodiment extend out from the surface of the electrolyte body 105, i.e., they may comprise bumps. A microstructure 110 in this embodiment may include one or more sidewalls 111, including substantially vertical sidewalls, and a bottom surface 113. As previously discussed, the microstructures 110 may be of any shape, size, and alignment. An outwardly extending microstructure 110 as shown may allow a proton to laterally enter or exit the electrolyte body 105.

FIG. 5 is an end view of an electrolyte body 105 including a thin film layer 118, such as a thin film catalyst or barrier layer, for example. The thin film layer 118 in this embodiment was formed using simple line-of-sight deposition. The thickness of the thin film layer 118 on the bottom surface 113 may typically be about 2 to about 10 atomic layers, and may be a function of the deposition on a sidewall (see FIGS. 12–13 and accompanying discussion).

The thin film layer 118 may be formed in any known manner, such as by physical vapor deposition (PVD) methods, including sputtering and e-beam evaporation. The thin film layer 118 is platinum or a platinum-based compound, such as a platinum ruthenium alloy, palladium, ruthenium, iridium, nickel, titanium, zirconium, tungsten, niobium and their oxides or alloys.

A line-of-sight deposition method used for forming the embodiment shown leaves the sidewalls 111 of the microstructures 110 uncovered and unobstructed by the thin film layer 118. The advantage to this is that proton transfer between the thin film layer 118 and the electrolyte body 105 is the most significant performance factor in PEM fuel cell operation. Therefore, in the structure shown, when a proton H+ is generated by the interaction of the fuel with the thin film layer 118, the proton H+ may travel laterally only a short distance in order to enter the electrolyte body 105 without having to pass through the thin film layer 118. It should be understood that a proton H+ may still diffuse directly through the thin film layer 118, as in the prior art. However, such microstructures 110 provide a large active area wherein protons generated on the bottom surface of a microstructure can easily move laterally into the electrolyte body 105.

Another advantage of the thin film layer 118 of the invention over a prior art powder catalyst is the solid electrical interconnection of all portions of the thin film layer 118. However, one drawback of this embodiment is a lack of electrical interconnection between portions of the catalyst layer on the bottom surfaces 113 with the thin film layer 118 on the anode surface 199.

FIG. 6 is an end view of the electrolyte body 105 according to another embodiment of the invention. This figure shows an alternate fabrication procedure that produces another embodiment. Prior to deposition of the thin film layer 118, the electrolyte body 105 is angled relative to the direction on the catalyst material deposition. The result is that the bottom surface 113 and at least one sidewall 111 of a microstructure 110 are covered with a thin film layer 118. The thin film layer 118 on the bottom surface 113 of the microstructure 110 is therefore electrically connected to the thin film layer 118 on the top surface of the electrolyte body 105 (i.e., on the anode surface 199). In this embodiment, the electron transfer efficiency is improved by providing an electrical connection to the thin film layer 118 on the bottom surface 113.

Figures 7, 8:
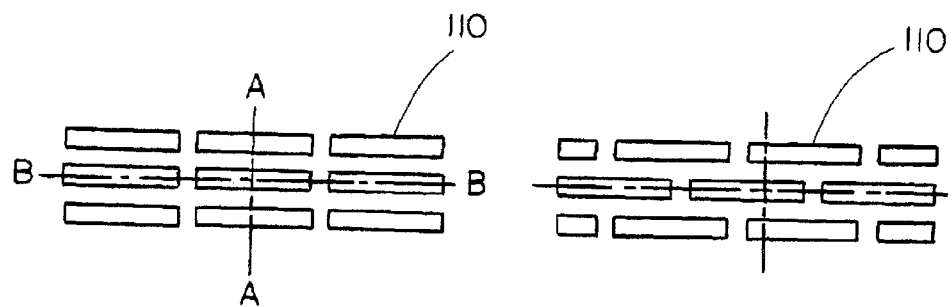
FIG. 7 shows a first microstructure arrangement embodiment wherein the microstructures are arranged in regular rows and regular columns.
FIG. 8 shows a second microstructure arrangement embodiment wherein the microstructures are arranged in regular rows and alternating columns.

FIG. 7 shows a first microstructure arrangement embodiment wherein the microstructures 110 are arranged in regular (i.e., aligned) rows and regular columns.

FIG. 8 shows a second microstructure arrangement embodiment wherein the microstructures 110 are arranged in regular rows and alternating columns. It should be understood that these two figures are not exhaustive and that other arrangements of the microstructures 110 may be employed.

Figure 9:
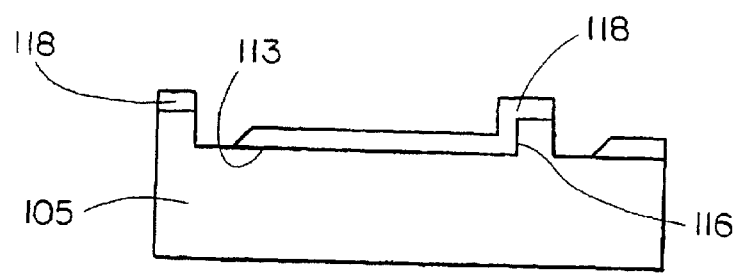
FIG. 9 is a cross-section of the electrolyte body along section line BB of FIG. 7 according to another embodiment of the invention.

FIG. 9 is a cross-section of the electrolyte body 105 along section line BB of FIG. 7 according to another embodiment of the invention. The figure shows the deposition of the thin film layer 118 on the bottom surface 113 and on an endwall surface 116 of a microstructure 110 (similar to FIG. 6), wherein the electrolyte body 105 was longitudinally angled during deposition of the thin film layer 118 (i.e., was inclined along axis BB). This embodiment achieves full interconnection of the bottom surface catalyst portions, while minimally affecting transverse travel and diffusion of protons H+ into the electrolyte body 105.

Figure 10:
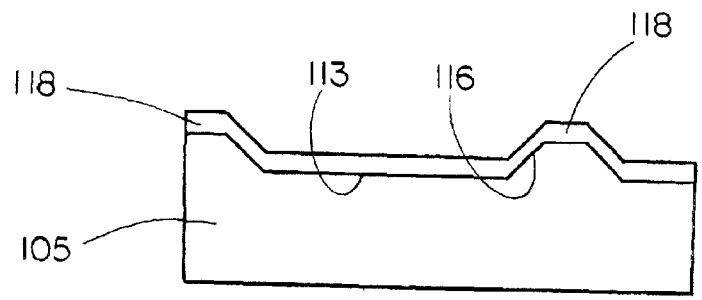
FIG. 10 is a cross-section of the electrolyte body along section line BB of FIG. 7 according to yet another embodiment of the invention.

FIG. 10 is a cross-section of the electrolyte body 105 along section line BB of FIG. 7 according to yet another embodiment of the invention. In this embodiment, an endwall 116 of a microstructure 110 may be angled. The deposition of the thin film layer 118 on the bottom surface 113 of the microstructure 110 and on the endwall surface or surfaces 116 may again be performed with the electrolyte body 105 being longitudinally angled. However, if the microstructure 110 is substantially rectangular and if both endwalls 116 are angled, the deposition of catalyst on the bottom surface 113 may be substantially continuous, as shown in the figure.

It should be understood that alternatively the electrolyte body 105 may be laterally inclined along the section line AA (see FIG. 7). As a result, the sidewalls may be covered with a thin film layer 118, as previously depicted in FIG. 6.

Figure 11:
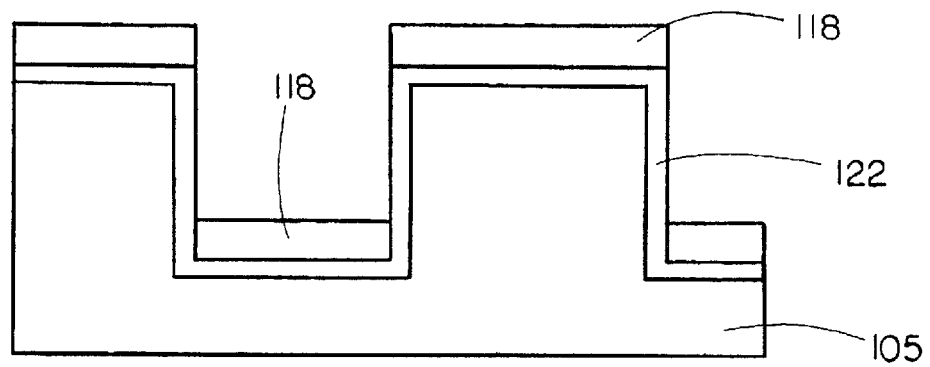
FIG. 11 shows an electrolyte body for a fuel cell that uses a methanol fuel, according to yet another embodiment of the invention.

FIG. 11 shows an electrolyte body 105 for a fuel cell that uses a methanol fuel, according to yet another embodiment of the invention. The electrolyte body 105 in this embodiment includes a methanol diffusion barrier layer 122 formed between the thin film layer 118 and the electrolyte body 105.

The barrier layer 122 may be desirable because there is a tendency of a methanol fuel to diffuse through the polymer electrolyte from the anode to the cathode, as occurs in the prior art. The diffusion of the methanol provides electrons at the cathode, and the resulting reaction of methanol with oxygen on the cathode side will deplete oxygen, therefore greatly deteriorating the fuel cell operation. Therefore, the electrical current produced by the prior art fuel cell is less than what can be achieved.

The invention eliminates this problem by depositing a barrier layer 122 that comprises a thin film of an element or compound possessing a high permeability to hydrogen. For example, the barrier layer 122 may comprise palladium, nickel, vanadium, tantalum, niobium, zirconium, and their composite films, alloys, and zeolites. The deposition of the barrier layer 122 may be by chemical vapor deposition (CVD), electroless deposition, physical vapor deposition (PVD) such as sputtering or e-beam evaporation with rotating substrate, or any conformal deposition method. The barrier layer 122 is deposited before the thin film layer 118, with the thin film layer 118 therefore being deposited on top of the barrier layer 122. The barrier layer 122 still allows protons to diffuse through into electrolyte body 105 but blocks anything larger than a proton.

Figure 12:
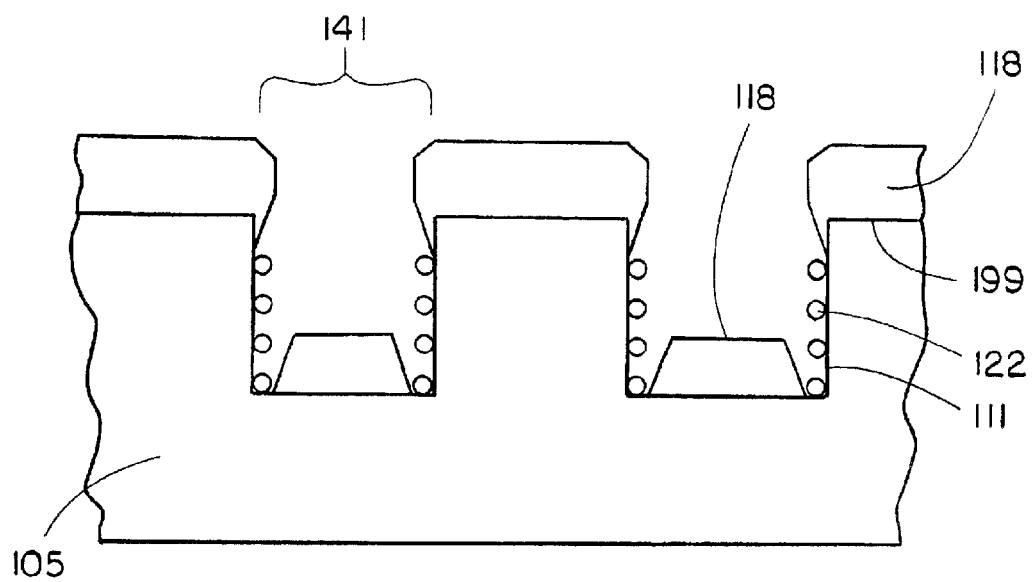
FIG. 12 shows an electrolyte body for use with a methanol fuel according to yet another embodiment.

FIG. 12 shows an electrolyte body 105 for use with a methanol fuel according to yet another embodiment. In this embodiment, the thin film layer 118 is deposited on the top surface of the electrolyte body 105 (i.e., on the anode surface 199) of a thickness to prevent methanol from passing through. In addition, the gap 141 between islands is kept small so that they are smaller than methanol molecules, but yet allow protons, the smallest atomic specie, to pass through. The result is no methanol diffusion into the electrolyte body 105.

The thin film layer 118 on the anode surface 199 may be about 2 to about 10 atomic layers in thickness, and the thin film layer 118 on the bottom surface may likewise be about 2 to about 10 atomic layers in thickness. In this embodiment, the barrier layer 122 may be thinly deposited on the sidewalls 111 of the microstructures 110, i.e., it may be non-continuous). This is represented in the drawing by the spaced-apart beads. When a non-continuous barrier layer 122 is employed, it may be formed of the same material as the thin film layer 118.

Figure 13:
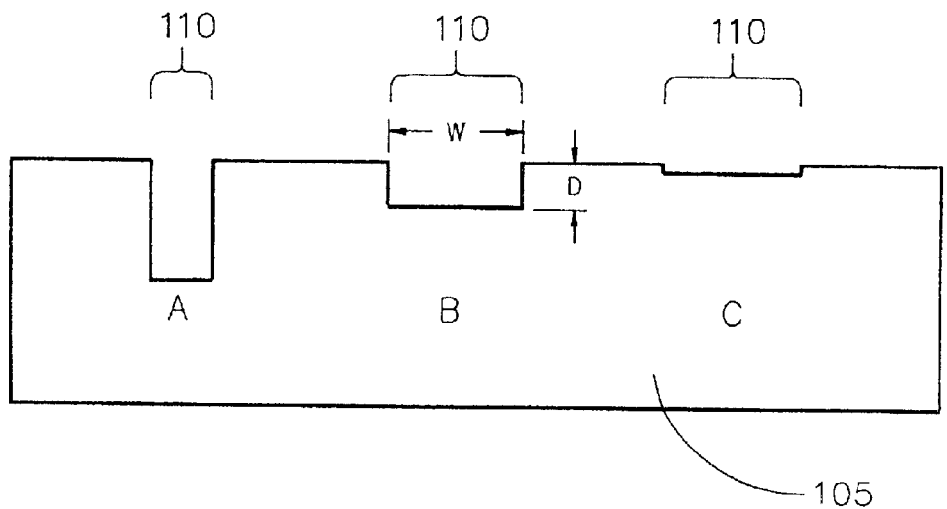
FIG. 13 shows an electrolyte body according to yet another embodiment of the invention.

FIG. 13 shows an electrolyte body 105 according to yet another embodiment of the invention. The electrolyte body 105 may include microstructures 110 of different sizes, such as depicted herein by microstructures A, B and C. In this embodiment, shadow deposition may be used in order to control deposition of catalyst on the sidewalls of the microstructures 110. Shadow deposition refers to a reduced thin film thickness on the sidewall relative to the film thickness on the top surfaces. Shadow deposition occurs due to the shadowing of the flux of incoming atoms by the sidewalls. Therefore, the ratio of catalyst layer thickness on the top surface to the catalyst layer thickness on the sidewalls depends on the aspect ratio (i.e., width vs. depth) of a particular microstructure. For example, microstructure B will experience much greater shadowing than microstructure C. Likewise, microstructure A will experience much greater shadowing than microstructure B.

Figure 14:
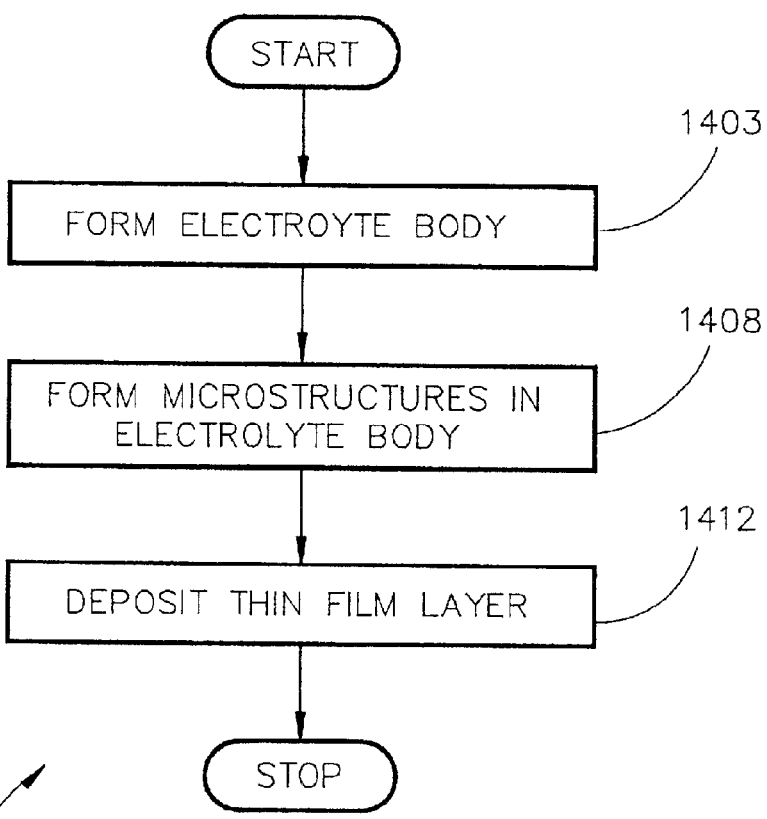
FIG. 14 is a flowchart of a method of forming a solid electrolyte for a fuel cell according to yet another embodiment of the invention.

FIG. 14 is a flowchart 1400 of a method of forming a solid electrolyte for a fuel cell according to yet another embodiment of the invention. In step 1403, an electrolyte body 105 is formed, including at least an anode surface 199 and a cathode surface. The electrolyte body 105 may be of any composition.

In step 1408, a plurality of microstructures 110 are formed in the electrolyte body 105 on the anode surface 199. A microstructure 110 may include one or more substantially vertical sidewalls 111 and a bottom surface 113 that is substantially co-planar with the anode surface 199. The microstructures 110 may be uniform or irregular and may be regularly or irregularly arranged.

The microstructures 110 may be formed in any way. In one embodiment the electrolyte body 105 is formed by casting electrolyte material in a mold. In another embodiment the electrolyte body 105 is formed by pressing a thermoplastic electrolyte into a mold at an elevated temperature. Other methods may likewise be employed to form the electrolyte body 105.

In step 1412, a thin film layer 118 is deposited on the electrolyte body 105. This includes deposition on the anode surface 199 and on at least a portion of the bottom surface 113. In addition, the thin film layer 118 may optionally be deposited on at least a portion of one or more sidewalls 111 of a microstructure 110, but preferably not on all sidewalls.

The step of depositing a thin film layer 118 may include angling the electrolyte body 105 during deposition, such as along a longitudinal axis BB (see FIGS. 7 and 9) to deposit catalyst on the endwalls 116. Alternatively, the electrolyte body 105 may be tilted along a lateral axis AA (see FIGS. 6, 7, and 10) to deposit catalyst on the sidewalls 111.

In addition, in methanol fuel applications the forming may further include forming a barrier layer 122 between the thin film layer 118 and electrolyte body 105, as previously discussed. The barrier layer 122 may be formed in non-continuous fashion on a sidewall 111 of a microstructure 110.

The electrolyte body 105 according to the invention may be employed in any fuel cell that employs a solid electrolyte. The electrolyte body 105 may be employed in any fuel cell that uses hydrogen or hydrogen-based fuels, especially methanol and other alcohols.

The microstructures 110 formed in the solid electrolyte body 105 provides several benefits. The microstructures 110 decrease proton travel distance through the thin film layer 118 and even the travel distance through the electrolyte body 105. The invention provides an increased area for proton diffusion into electrolyte body 105, including surface area regions not covered or obstructed by catalyst layers 118. As a result, there is less diffusion of fuel into or through the electrolyte body 105 and less use of costly platinum. Therefore, the microstructures 110 allow more efficient proton transfer into and through the electrolyte body 105 and therefore provide a greater efficiency in the fuel cell.

We claim:

1. An electrolyte for a fuel cell, comprising:

an electrolyte body including at least an anode surface and a cathode surface;

a plurality of microstructures formed into or extending out of at least one of said anode surface or said cathode surface, at least one of said microstructures having a depth or a height, at least one sidewall and a bottom surface; and thin film layers formed on said anode surface and on said cathode surface, said thin film layers comprising top surface thin film layers formed on said anode surface and on said cathode surface and bottom surface thin film layers formed on at least a portion of said bottom surface wherein all portions of said thin film layers having a thickness less than said depth or height.

2. The electrolyte of claim 1, wherein said thin film layers comprise a catalyst layer.

3. The electrolyte of claim 2, wherein said catalyst layer comprises at least one of platinum, palladium, ruthenium, iridium, osmium, nickel, titanium, gold, silver, alloys thereof or oxides thereof.

4. The electrolyte of claim 1, further comprising a sidewall thin film layer formed on said at least one sidewall, said sidewall thin film layer forming an electrical interconnection between said top surface thin film layer and said bottom surface thin film layer.

5. The electrolyte of claim 1, further comprising a sidewall thin film layer formed on an angled sidewall, said sidewall thin film layer forming an electrical interconnection between said top surface thin film layer and said bottom surface thin film layer.

6. The electrolyte of claim 1, wherein said at least one of said plurality of microstructures is substantially rectangular.

7. The electrolyte of claim 1, wherein said thin film layers are formed by deposition.

8. The electrolyte of claim 1, wherein said thin film layers are about two to about ten atomic layers in thickness.

9. The electrolyte of claim 1, wherein a thin film layer covers all sidewalls of said at least one microstructure.

10. The electrolyte of claim 1, wherein an opening formed by a thin film layer on said at least one sidewall is smaller in at least one dimension than a methanol molecule.

11. The electrolyte of claim 1, further comprising a barrier layer formed between said thin film layer and at least one of said anode surface or said cathode surface, said barrier layer preventing diffusion of methanol into said electrolyte body.

12. An electrolyte for a fuel cell, comprising:
an electrolyte body including at least an anode surface and a cathode surface;
a plurality of microstructures formed into or extending out of at least one of said anode surface or said cathode surface, at least one of said microstructures having a depth or a height, at least one sidewall and a bottom surface;
a barrier layer formed on said anode surface, said barrier layer preventing diffusion of methanol into said electrolyte body; and
catalyst layers formed on said barrier layer and on said cathode surface, wherein said barrier layer and said catalyst layers comprise surface barrier and catalyst layers formed on said anode surface and on said cathode surface and including a bottom surface barrier and catalyst layer formed on at least a portion of said bottom surface of said microstructure.

13. The electrolyte of claim 12, wherein said barrier layer is at least partially non-continuous on a sidewall of said at least one microstructure.

14. The electrolyte of claim 12, wherein an opening formed by said at least one microstructure is smaller in at least one dimension than a methanol molecule.

15. The electrolyte of claim 12, wherein said barrier layer and said catalyst layer cover all sidewalls of said at least one microstructure.

16. The electrolyte of claim 12, wherein said barrier layer is substantially continuous on a sidewall of said at least one microstructure and is impermeable to a methanol molecule but is permeable to a hydrogen atom or a proton.

17. The electrolyte of claim 12, wherein said barrier layer comprises at least one of palladium, a palladium alloy or zeolite.

18. A fuel cell, comprising:
a cathode;
an electrolyte body formed on said cathode and including an anode surface and a cathode surface;
a plurality of microstructures formed into or extending out of at least one of said anode surface or said cathode surface, at least one of said microstructures having a depth or a height, at least one sidewall and a bottom surface;
thin film layers formed on said anode surface and on said cathode surface, said thin film layers comprising a top surface thin film layer formed on said anode surface and on said cathode surface and a bottom surface thin film layer formed on at least a portion of said bottom surface, wherein all portions of said thin film layers having a thickness less than said depth or height; and
an anode formed on said catalyst layer.

19. The fuel cell of claim 18, further comprising a sidewall thin film layer formed on the at least one sidewall, said sidewall thin film layer forming an electrical interconnection between said top surface thin film layer and said bottom surface thin film layer.

20. The fuel cell of claim 18, further comprising a sidewall thin film layer formed on an angled sidewall, said sidewall thin film layer forming an electrical interconnection between said top surface thin film layer and said bottom surface thin film layer.

21. The electrolyte of claim 18, wherein said at least one of said plurality of microstructures is substantially rectangular.

22. The fuel cell of claim 18, wherein said thin film layer is formed by deposition.

23. The fuel cell of claim 18, wherein said thin film layer is about two to about ten atomic layers in thickness.

24. The fuel cell of claim 18, wherein a thin film layer covers all sidewalls of said at least one microstructure.

25. The fuel cell of claim 18, wherein an opening formed by said at least one microstructure is smaller in at least one dimension than a methanol molecule.

26. The fuel cell of claim 18, further comprising a barrier layer formed between said thin film layer and said anode surface, with said barrier layer preventing diffusion of methanol into said electrolyte body.

27. A method of forming a solid electrolyte for a fuel cell, comprising the steps of:
forming an electrolyte body including at least an anode surface and a cathode surface;
forming a plurality of microstructures into or extending out of at least one of said anode surface or said cathode surface, at least one of said plurality of microstructures having a depth or a height, at least one substantially vertical sidewall and a bottom surface; and
forming thin film layers on said anode surface and said cathode surface, comprising forming a top surface thin film layer on said anode surface and on said cathode surface and forming a bottom surface thin film layer on at least a portion of said bottom surface of said at least one microstructure wherein all portions of said thin film layers having a thickness less than said depth or height.

28. The method of claim 27, further comprising the step of forming a sidewall thin film layer on said at least one sidewall in order to form an electrical interconnection between said top surface thin film layer and said bottom surface thin film layer.

29. The method of claim 27, wherein the step of forming a plurality of microstructures further comprises the steps of forming at least one angled sidewall; and forming a sidewall thin film layer on said at least one sidewall in order to form an electrical interconnection between said top surface thin film layer and said bottom surface thin film layer.

30. The method of claim 27, wherein the step of forming said thin film layer further comprises depositing said thin film layer.

31. The method of claim 27, wherein the step of forming said thin film layer further comprises depositing said thin film layer about two to about ten atomic layers in thickness.

32. The method of claim 27, wherein a thin film layer covers all sidewalls of said at least one microstructure.

33. The method of claim 27, wherein the step of forming a plurality of microstructures further comprises forming said plurality of microstructures that are smaller in at least one dimension than a methanol molecule.

34. The method of claim 27, further comprising the step of forming a barrier layer between said thin film layer and at least one of said anode surface or said cathode surface, said barrier layer preventing diffusion of methanol into said electrolyte body.

35. The electrolyte of claim 1, wherein a thin film layer is at least partially non-continuous on a sidewall of said microstructure.

36. The fuel cell of claim 18, wherein said thin film layers comprise a catalyst layer.

37. The electrolyte of claim 36, wherein said catalyst layer comprises at least one of platinum, palladium, ruthenium, iridium, osmium, nickel, titanium, gold, silver, alloys thereof or oxides thereof.

38. The fuel cell of claim 18, wherein a thin film layer is at least partially non-continuous on a sidewall of said microstructure.

39. The method of claim 27, wherein a thin film layer is at least partially non-continuous on a sidewall of said microstructure.

* * * * *